Nov. 24, 1959 F. L. BUZARD 2,914,408
FISH BAIT
Filed Sept. 23, 1957

INVENTOR
F. L. BUZARD
BY
ATTORNEYS

United States Patent Office 2,914,408
Patented Nov. 24, 1959

2,914,408

FISH BAIT

Fred L. Buzard, Knox, Pa.

Application September 23, 1957, Serial No. 685,619

3 Claims. (Cl. 99—3)

This invention relates to sports and other outdoor activities such as hunting, fishing and the like, as well as to the materials and equipment employed in the pursuit thereof, and particularly to bait attached to hooks on fishing lines and used to attract and catch fish.

The invention is concerned with bait having certain physical characteristics such as resistance to weather and temperature change, the ability to withstand high temperatures as well as low, strength, stability and durability sufficient to allow use over an extended period as well as bait which will attract and prove successful in the catching of fish.

Articles used in fishing and supposed to appeal to the piscatorial senses have been almost too numerous to mention, some being intended to appeal to the sight and others to other senses and particularly to the taste which is considered by far the most important in view of the fact that it has been said that the best way to the heart is through the stomach.

Many of the substances employed to lure or attract fish have been ineffective or unsatisfactory, while others have been more satisfactory and volumes have been written in an effort to describe or characterize the reasons for such success but with all of such writings disqualified and the reasons why one type of lure or bait has been successfully used in one instance and been unsuccessful in other instances is still unexplained.

Aside from the viewpoint of effectiveness, baits have been unsatisfactory from the viewpoint of appearance and physical characteristics and as lacking particularly strength and stability sufficient to permit the use and reuse thereof.

It is an object of the invention to overcome the shortcomings enumerated above and the provide bait which can be placed on a hook attached to a fishing line and successfully and repeatedly used in the catching of fish whether with a hook, a spinner, or other rig.

Another object of the invention is to produce bait of superior value for the use in the catching of fish which bait can be produced with minimum cost, from materials found in abundance and independently or individually of little value, in fact the major material being a waste product preserved by a substance found abundantly in nature such as sodium chloride, sodium nitrate and benzoic acid.

Another object of the invention is to provide bait, a bait package, and a method of preparing or producing each from material and in a manner not heretofore known and employed and with such prepared bait effective in the catching of fish.

Figure 1:
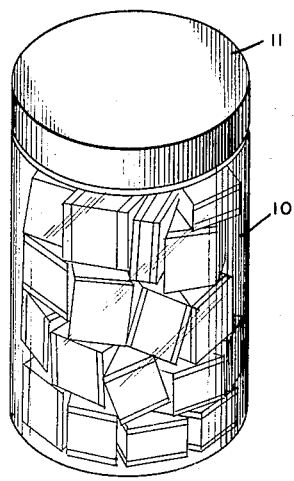
Figure 2:
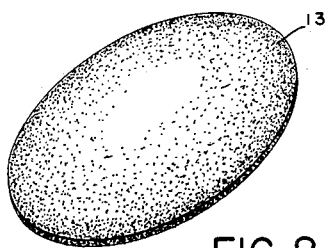
Figure 3:
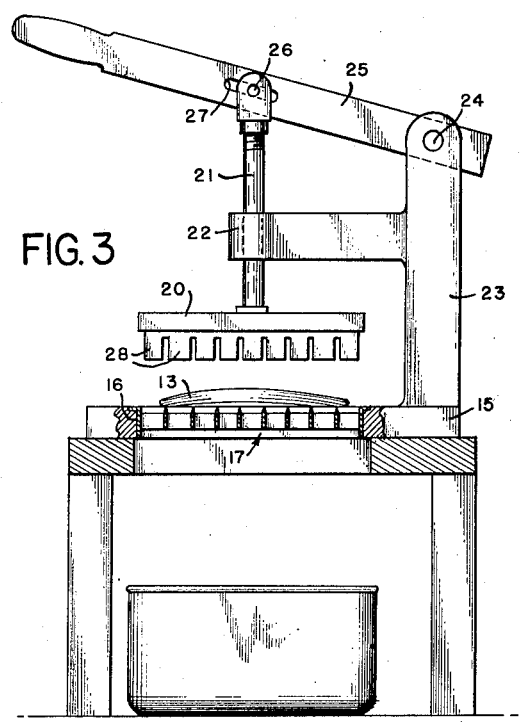
Figure 4:
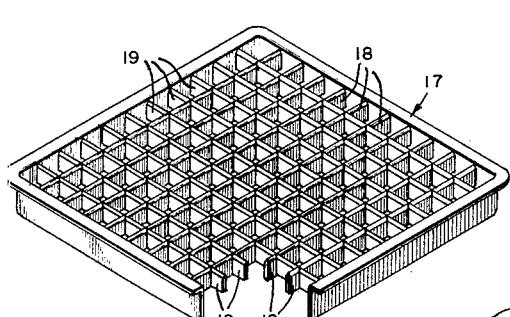
Figure 5:
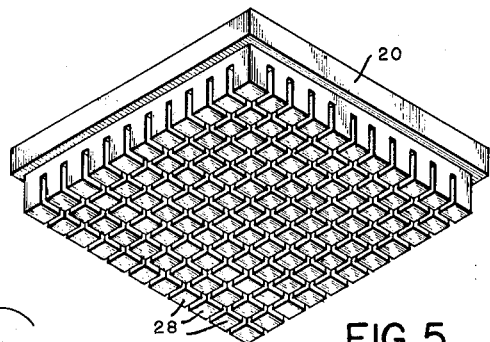
Figure 6:
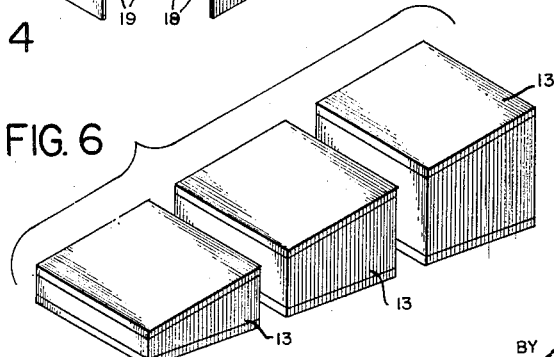

Other objects and advantages of the invention will be apparent from the following description taken in conjunction with the accompanying drawing wherein:

Fig. 1 is a perspective of the container filled with bait;
Fig. 2, a perspective of beef or other animal spleen from which the bait of the present invention is produced;
Fig. 3, a side elevation of the bait cutting machine;
Fig. 4, a top perspective of the cutter blades;
Fig. 5, a bottom perspective of the presser head; and
Fig. 6, a perspective of several portions of bait after they have been cut.

Briefly stated a bait package is provided which is composed of segments or small pieces of animal spleen, preferably in the form of small chunks or cubes, on which the tough surface skin is left intact and the small chunks are placed in small containers or jars of any desired material transparent, translucent or the like but preferably of amber color to increase or preserve the life of the same and the small chunks in such amber colored jars are impregnated with a preservative solution containing salt, saltpeter, benzoic acid and a small amount of coloring. This solution keeps moist and preserves the cubes or chunks of spleen, the saltpeter having reddened or enriched the color thereof as well as having caused the surface skins on opposite sides of the bait to have a lighter color while the intermediate portion of the spleen has a darker or more vivid color.

The bait thus produced is sinuous, has an intermediate soft or porous center between the tough protective surface and skins, due to its physical characteristics is a suitable and satisfactory mass and possesses other characteristics which appear to be attractive to the fish in that they are readily attracted to it and prove its superiority as a bait to other baits such as pork rind, salmon roe, salted minnows and the like.

With continued reference to the drawing a bait package is produced of an amber colored container or receptacle 10 having a screw top 11, the color of the container serving to modify the sunlight to reduce its deteriorating effect on the contained matter.

Within the container are placed small pieces or segments 12 of the spleen 13 of an animal from the bovine or other family. The small segments or pieces 12 of spleen preferably are in the form of chunks or cubes with the tough skin 14 on each of the opposite surfaces left intact and contributing to the unification of the mass, the handling of the same, and its durability or lasting qualities. It has been found that approximately ½ inch cubes are satisfactory.

The spleen 13 may be cut in any desired manner to provide small chunks of a cross-section of ½ x ½ inches and of a length corresponding to the thickness of the portion of the spleen from which the chunk was cut. In order to simplify, accelerate, render the portions more uniform, and to reduce the labor required in the cutting of the spleen a suitable machine may be employed.

Such machine comprises a base 15 having a square opening 16 for the reception of a cutter blade 17 composed of cross cutters 18 and 19 defining multiple square openings between the same so that when spleen is placed thereon and forced down upon the cutters it will be cut into portions having a square cross-section.

In order to force the spleen downwardly past the cutters a press head 20 is provided mounted on a stem 21 movable in a bracket 22 attached to a post 23 mounted on the base 15 and provided with a pivot 24 to which a lever or operating arm 25 is connected. The arm 25 likewise has a pivotal connection 26 with the stem 21 for forcing it and the press head downwardly against the spleen. A slot 27 is provided in the lever arm 25 to allow sufficient relative movement between the lever and the stem 21. From the foregoing it will be apparent that when the spleen is placed on a base beneath the press head and the lever arm operated to force the stem 21 and press head 20 downwardly the spleen will be forced downwardly between the cutting edges of the cutting grid 17.

The press head 20 is provided with a series of projections 28, square in cross-section and slightly smaller than the space defined by the cutting blades 18 and 19. These squares force the spleen between the cutting blades so that they drop through the base of the machine where they may be collected for disposition in containers 10.

After the cubes have been cut they are subjected to a saturated sodium chloride solution or a solution in which the sodium chloride is of a strength corresponding substantially to ¼ pound to ½ gallon of water. In the solution also is a small amount of sodium nitrate or saltpeter, from 1/10 to 1% of benzoic acid and a small amount of coloring matter.

The solution just described serves the multiple functions of giving life to and preserving the impregnated bait and adding to the attractiveness thereof, the sodium nitrate being credited with reddening or enriching the color as well as causing the surface skins on opposite surfaces of the bait to have a lighter more distinctive color, while the intermediate portion has a darker or more vivid color.

The bait package thus produced is sealed until it is desired to use the same whereupon it will be found that the bait is sinuous, with an intermediate soft or porous portion or center between tough protective wrappings or surface skins. Due to its physical characteristics it is a suitable and satisfactory mass and possesses other characteristics which appear to be attractive to the fish since they respond and indicate its superiority as a bait over other baits such as pork rind, salmon roe, minnows and the like.

It will be obvious to those skilled in the art that various changes may be made in the invention without departing from the spirit and scope thereof and therefore the invention is not limited by that which is illustrated in the drawing and described in the specification, but only as indicated in the accompanying claims.

What is claimed is:

1. A bait package comprising a sealed amber colored container substantially one-half inch thick, beef spleen cubes in said container, said cubes being on the order of one-half inch in size and having relatively tough surface skin on opposite surfaces, said cubes being impregnated with a saturated solution of sodium chloride containing a relatively small amount of sodium nitrate, from .1 to 1% of benzoic acid, and a small amount of coloring matter.

2. A bait package comprising a sealed amber colored container, substantially one-half inch thick, beef spleen cubes in said container, said cubes having relatively tough surface skin on opposite surfaces, said cubes being impregnated with a saturated solution of sodium chloride, sodium nitrate, benzoic acid, and a small amount of coloring matter.

3. A method of preparing a package of fish bait comprising selecting detached beef spleen, cutting said beef spleen through its thickness into small chunks approximately ½ x ½ inches, so that the relatively tough surface skin will remain intact, placing a group of such chunks in an amber colored container, adding a preservative containing sodium chloride, sodium nitrate, benzoic acid, and coloring matter, the salt being of a strength corresponding substantially to ¼ pound to ½ gallon of water, with 1 teaspoon of sodium nitrate, and .1 to 1% of benzoic acid, the solution assisted by the color of the container serving to preserve the bait, and adding a cover and sealing such cover on said container.

References Cited in the file of this patent
UNITED STATES PATENTS 1,659,132   Coffman _____ Feb. 14, 1928

FOREIGN PATENTS 341,775   Great Britain _____ Jan. 22, 1931